(12) United States Patent
Yang et al.

(10) Patent No.: US 8,742,737 B2
(45) Date of Patent: Jun. 3, 2014

(54) SWITCHED-MODE POWER SUPPLY CONTROLLING CIRCUIT AND SWITCHED-MODE POWER SUPPLY USING THE SAME

(75) Inventors: Xiaohua Yang, Shenzhen (CN); Wenhui Ye, Shenzhen (CN)

(73) Assignee: BYD Company Limited (CN)

( * ) Notice: Subject to any disclaimer, the term of this patent is extended or adjusted under 35 U.S.C. 154(b) by 428 days.

(21) Appl. No.: 13/169,835

(22) Filed: Jun. 27, 2011

(65) Prior Publication Data

US 2011/0317458 A1 Dec. 29, 2011

(30) Foreign Application Priority Data

Jun. 29, 2010 (CN) .......................... 2010 1 0218923

(51) Int. Cl.
*G05F 1/40* (2006.01)
*H02M 3/335* (2006.01)

(52) U.S. Cl.
USPC ....................................... 323/268; 363/21.12

(58) Field of Classification Search
CPC ...... H02M 3/33515; H02M 3/157; G05F 1/44
USPC ......... 323/268, 271, 282–285; 363/20, 21.01, 363/21.12–21.18
See application file for complete search history.

(56) References Cited

U.S. PATENT DOCUMENTS

| 7,504,815 | B2 * | 3/2009 | Moyse et al. | 323/351 |
| 8,106,642 | B2 * | 1/2012 | Chen et al. | 323/284 |
| 8,274,270 | B2 * | 9/2012 | Hsieh et al. | 323/283 |
| 2012/0281438 | A1 * | 11/2012 | Fang et al. | 363/21.12 |

* cited by examiner

Primary Examiner — Matthew Nguyen
(74) Attorney, Agent, or Firm — Alston & Bird LLP (57) ABSTRACT

A controlling circuit is provided for controlling an output voltage of a main circuit of a switched-mode power supply. The controlling circuit includes components that generate a switching status selecting signal reflecting a voltage change of the main circuit, and output a reference voltage according to a voltage output status selected according to the switching status selecting signal. Other components output a pulse width modulation controlling signal according to the reference voltage and a current signal reflecting a current change of the main circuit, and output a pulse frequency modulation controlling signal with a frequency according to a frequency output status selected according to the switching status selecting signal. Yet other components output a switching controlling signal according to the controlling signals, and control a switch of the main circuit to switch-on or switch off according to the switching controlling signal to stabilize the output voltage of the main circuit.

22 Claims, 8 Drawing Sheets

FIG. 1

D_max,      fsw_max
0.9*D_max,  0.9*fsw_max
0.8*D_max,  0.8*fsw_max
0.7*D_max,  0.7*fsw_max
0.6*D_max,  0.6*fsw_max
0.5*D_max,  0.5*fsw_max
0.4*D_max,  0.4*fsw_max
0.3*D_max,  0.3*fsw_max
0.2*D_max,  0.2*fsw_max
0.1*D_max,  0.1*fsw_max

0000: D_max, fsw_max
0001: 0.9*D_max, 0.9*fsw_max
0010: 0.8*D_max, 0.8*fsw_max
0011: 0.7*D_max, 0.7*fsw_max
0100: 0.6*D_max, 0.6*fsw_max
0101: 0.5*D_max, 0.5*fsw_max
0110: 0.4*D_max, 0.4*fsw_max
0111: 0.3*D_max, 0.3*fsw_max
1000: 0.2*D_max, 0.2*fsw_max
1001: 0.1*D_max, 0.1*fsw_max

SWITCHED-MODE POWER SUPPLY CONTROLLING CIRCUIT AND SWITCHED-MODE POWER SUPPLY USING THE SAME

CROSS REFERENCE TO RELATED APPLICATION(S)

This application claims priority benefit under 35 U.S.C. §119 of Chinese Patent Application No. 201010218923.6, filed on Jun. 29, 2010, the content of which is incorporated herein by reference in its entirety.

TECHNOLOGICAL FIELD

Example embodiments of the present disclosure relate generally to a power supply controlling circuit, and more particularly, to a switched-mode power supply controlling circuit and the switched-mode power supply using the same.

BACKGROUND

The present portable electronic devices usually use the battery as the power supply device. When the battery power runs out, the electronic device needs to be charged by an adapter to ensure the normal work. With wide adaptive range and high converting efficiency, the switched-mode power supply (SMPS) has been widely applied to portable electronic devices.

The SMPS usually comprises two modes: the pulse width modulation (PWM) mode and the pulse frequency modulation (PFM) mode, which may be converted through a hybrid converter for the SMPS. And like the SMPS, the hybrid converter for the SMPS has been widely applied to portable electronic devices.

In the PWM mode, the hybrid converter for the SMPS works under a constant frequency, and a PWM controlling unit adjusts the conduction time of the power switch according to the load situation. In the PFM mode, the hybrid converter for the SMPS usually has a strong load capacity and may output an output voltage with small ripple and constant frequency. In a heavy load condition, a high efficiency may be achieved; but in a light load condition, the constant switching loss of the hybrid converter for the SMPS may decrease the efficiency.

In the PWM mode, the frequency of the hybrid converter changes according to the value of the load. In a light load condition, the frequency decreases and causes a corresponding decrease in the switching loss, which may result in the hybrid converter achieving a high efficiency under the light load.

As mentioned above, when in which the hybrid converter automatically switches between PWM and PFM modes according to the load condition, the hybrid converter may maintain a high efficiency, which may enable the power supply to achieve high efficiency and the battery to achieve longer endurance. Conventionally, a hybrid converter that can automatically switch between two modes requires an automatic conversion controlling circuit, a PWM circuit and a PFM circuit. The automatic conversion controlling circuit controls the PWM circuit and the PFM circuit to work according to the load condition so as to make the main circuit of the power supply output a stable voltage. However, the automatic conversion controlling circuit is complicated and hard to realize.

SUMMARY

According to one exemplary embodiment of the present invention, a switched-mode power supply (SMPS) controlling circuit is presented for controlling an output voltage of a main circuit of a SMPS ("exemplary" as used herein referring to "serving as an example, instance or illustration"). The SMPS controlling circuit includes a switching status selecting unit configured to generate a switching status selecting signal according to a voltage feedback signal reflecting a voltage change of the main circuit. The SMPS controlling circuit includes a reference voltage generating unit connected with the switching status selecting unit, and configured to output a reference voltage according to a voltage output status selected from a plurality of voltage output statuses according to the switching status selecting signal.

The SMPS controlling circuit also includes a first comparator connected with the reference voltage generating unit, and configured to output a pulse width modulation (PWM) controlling signal according to the reference voltage, and according to a current feedback signal that reflects a current change of the main circuit. The SMPS controlling circuit includes a pulse frequency modulation (PFM) controlling unit connected with the switching status selecting unit, and configured to output a PFM controlling signal with a frequency according to a frequency output status selected from a plurality of frequency output statuses according to the switching status selecting signal. Further, the SMPS controlling circuit includes logic unit connected with the first comparator and the PFM controlling unit, and configured to output a switching controlling signal according to the PWM controlling signal and the PFM controlling signal. And the SMPS controlling circuit includes a driving unit connected with the logic unit, and configured to control a power switch of the main circuit to switch-on or switch off to thereby stabilize the output voltage of the main circuit according to the switching controlling signal.

According to another exemplary embodiment of the present invention, SMPS comprising the SMPS controlling circuit mentioned above is presented.

BRIEF DESCRIPTION OF THE DRAWINGS

Having thus described example embodiments of the present disclosure in general terms, reference will now be made to the accompanying drawings, which are not necessarily drawn to scale, and wherein:

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

Figure 1:
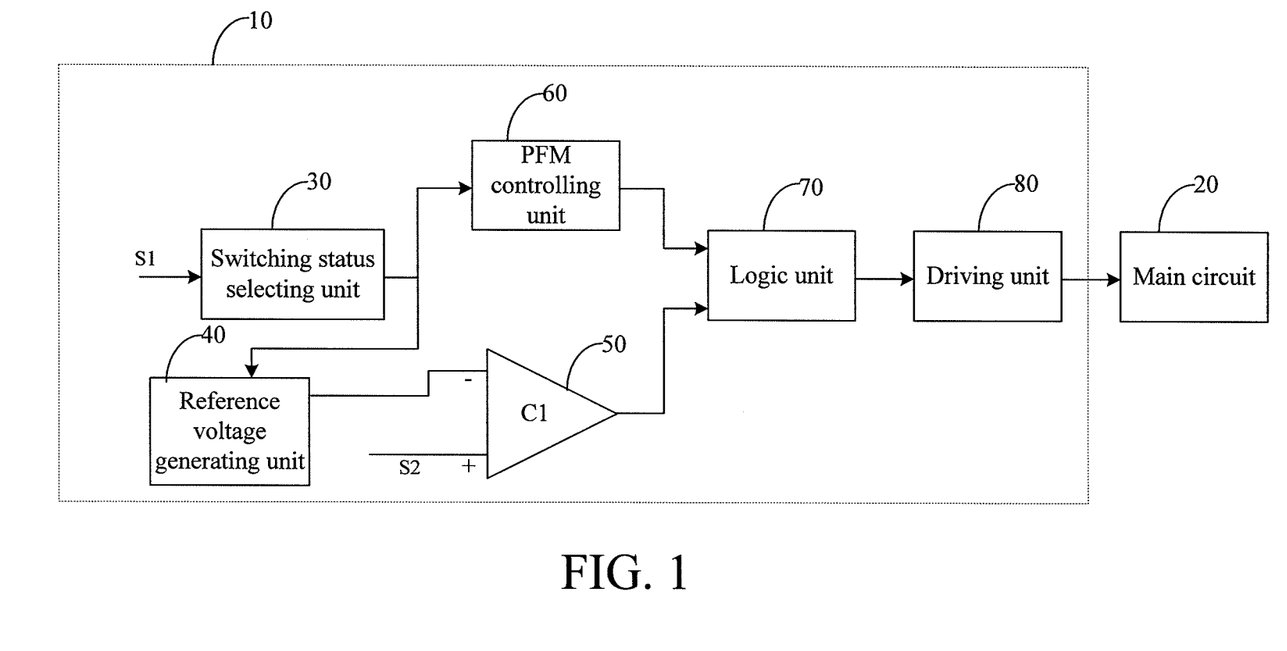
FIG. 1 illustrates a schematic block diagram of a switched-mode power supply (SMPS) controlling circuit according to one exemplary embodiment of the present invention.

FIG. 1 illustrates a schematic block diagram of a switched-mode power supply (SMPS) controlling circuit 10 for controlling an output voltage of a main circuit 20 of the SMPS. The SMPS controlling circuit 10 includes a switching status selecting unit 30 configured to generate a switching status selecting signal according to a voltage feedback signal S1 reflecting a voltage change of the main circuit 20. The SMPS controlling circuit 10 also includes a reference voltage generating unit 40 connected with the switching status selecting unit 30, and configured to output a reference voltage according to a voltage output status selected from a plurality of voltage output statuses according to the switching status selecting signal.

The SMPS controlling circuit 10 includes a first comparator (C1) 50 connected with the reference voltage generating unit 40, and configured to output a pulse width modulation (PWM) controlling signal according to the reference voltage output by the reference voltage generating unit 40, and according to a current feedback signal S2 that reflects a current change of the main circuit 10. The SMPS controlling circuit 10 also includes a pulse frequency modulation (PFM) controlling unit 60 connected with the switching status selecting unit 30, and configured to output a PFM controlling signal with a frequency according to a frequency output status selected from a plurality of frequency output statuses according to the switching status selecting signal output by the switching status selecting unit 30.

Further, the SMPS controlling circuit 10 includes a logic unit 70 connected with the first comparator 50 and the PFM controlling unit 60, and configured to output a switching controlling signal according to the PWM controlling signal output by the first comparator 50, and according to the PFM controlling signal output by the PFM controlling unit 60. And the SMPS controlling circuit 10 includes a driving unit 80 connected with the logic unit 70, and configured to control a power switch of the main circuit 20 to switch on or switch off to thereby stabilize the output voltage of the main circuit according to the switching controlling signal.

Figure 2:
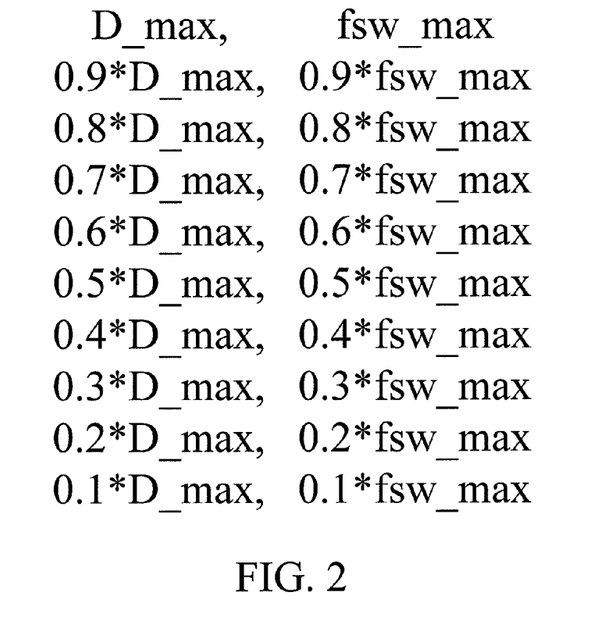
FIG. 2 illustrates schematic diagram of a relationship between the switch-on duration and the frequency of the switching controlling signal according to one exemplary embodiment of the present invention.

Referring to FIG. 2, the left column is the switch-on duration of the switching controlling signal, and the right column is the frequency of the switching controlling signal. In this exemplary embodiment, each row represents a switching controlling signal. For example, D_max and fsw_max correspond to a switching controlling signal with the D_max switch-on duration and fsw_max frequency, and the switching controlling signal may be configured to control the power switch to switch on or off at the frequency fsw_max in the D_max switch-on duration. In one example, the logic unit 70 may be configured to output ten switching controlling signals.

In some exemplary embodiment of the present invention, the reference voltage generating unit 40 may be configured to output a reference voltage according to a voltage output status selected from ten voltage output statuses by the switching status selecting signal, where each status may be selected according to the switching status selecting signal corresponding to a reference voltage. The first comparator 50 may be configured to compare the reference voltage with the current feedback signal, and output the PWM controlling signal that determines the switch-on duration of the switching controlling signal. That is, one reference voltage may correspond to a switch-on duration of the switching controlling signal, and ten reference voltages may correspond to ten switch-on durations of the switching controlling signal.

In some exemplary embodiments of the present invention, the PFM controlling unit 60 may be configured to output a PFM controlling signal with a frequency according to a frequency output status selected from ten frequency output statuses by the switching status selecting signal, the PFM controlling signal with the same frequency as the frequency output status selected according to the switching status selecting signal. The PFM controlling signal may determine the frequency of the switching controlling signal.

In FIG. 2, the switch-on durations begin from D_max and decrease 10% each time to 0.1 D_max, and the frequencies begin from fsw_max and decrease 10% each time to 0.1 fsw_max. The value of D_max and fsw_max may be determined according to different situations, and the decreasing mode is not limited to the arithmetic sequence mode.

Figure 3:
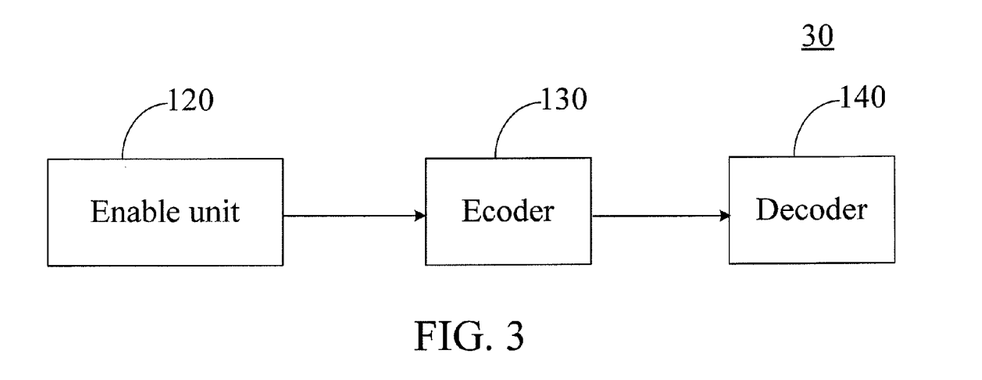
FIG. 3 is a schematic block diagram of the switching status selecting unit according to one exemplary embodiment of the present invention.

FIG. 3 shows a schematic block diagram of the switching status selecting unit 30 according to one exemplary embodiment of the present invention. The switching status selecting unit 30 may include an enable unit 120, an encoder 130 connected with the enable unit 120, and a decoder 140 connected with the encoder. The enable unit 120 may be configured to generate an enable signal according to the voltage feedback signal. The encoder 130 may be configured to select and output a status according to the enable signal, with the status being selected from a plurality of statuses corresponding to the voltage output statuses and the frequency output statuses. The decoder 140 may be configured to convert the status selected and output by the encoder to the switching status selecting signal. In some exemplary embodiments of the present invention, the encoder is a reversible counter and the enable signal includes a count enable signal configured to control the reversible counter to count up or down, and a reset enable signal configured to control the reversible counter to jump to the minimum count value when the voltage feedback signal is less than the reference voltage.

Figure 4:
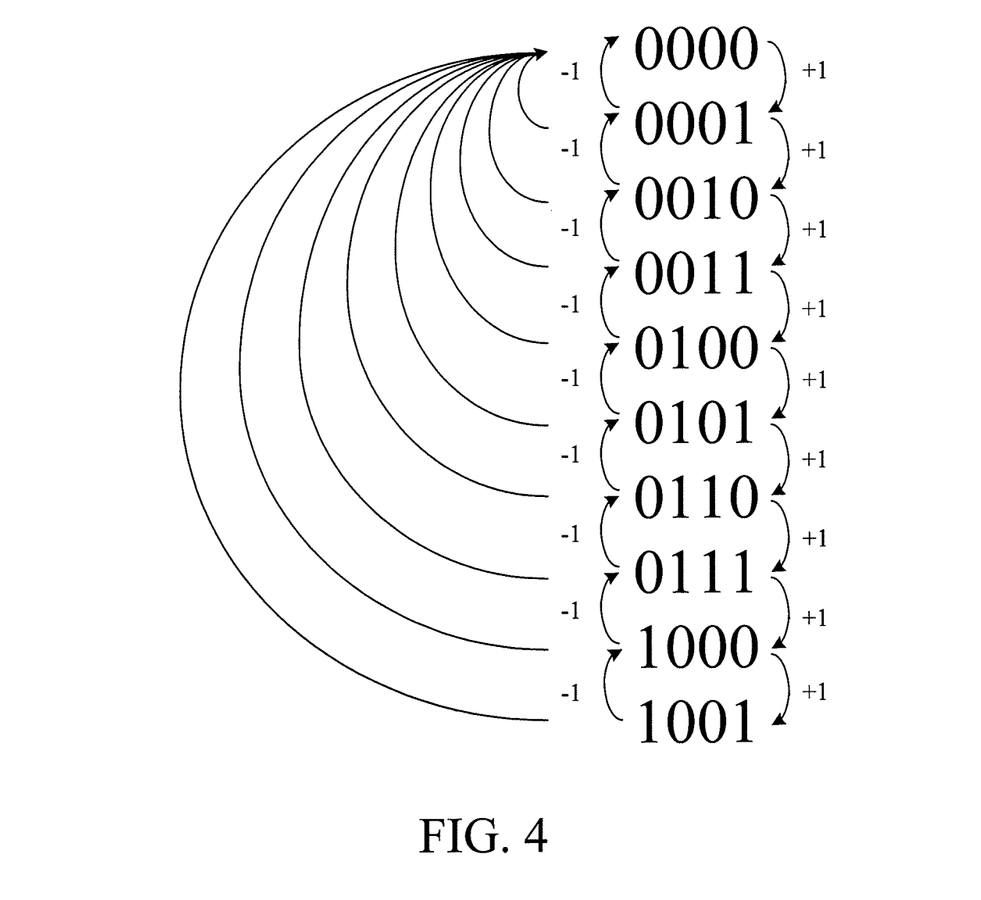
FIG. 4 is the status diagram of the encoder of the switching status selecting unit according to one exemplary embodiment of the present invention.

FIG. 4 shows the status diagram of the encoder 130 of the switching status selecting unit 30 according to one exemplary embodiment of the present invention. In some exemplary embodiments of the present invention, the encoder 130 is a reversible counter. Referring to FIG. 4, the statuses are the count values of the reversible counter. The count value comprises ten four-digit binary numbers. In one example, the encoder is a 4-16 encoder.

Figure 5:
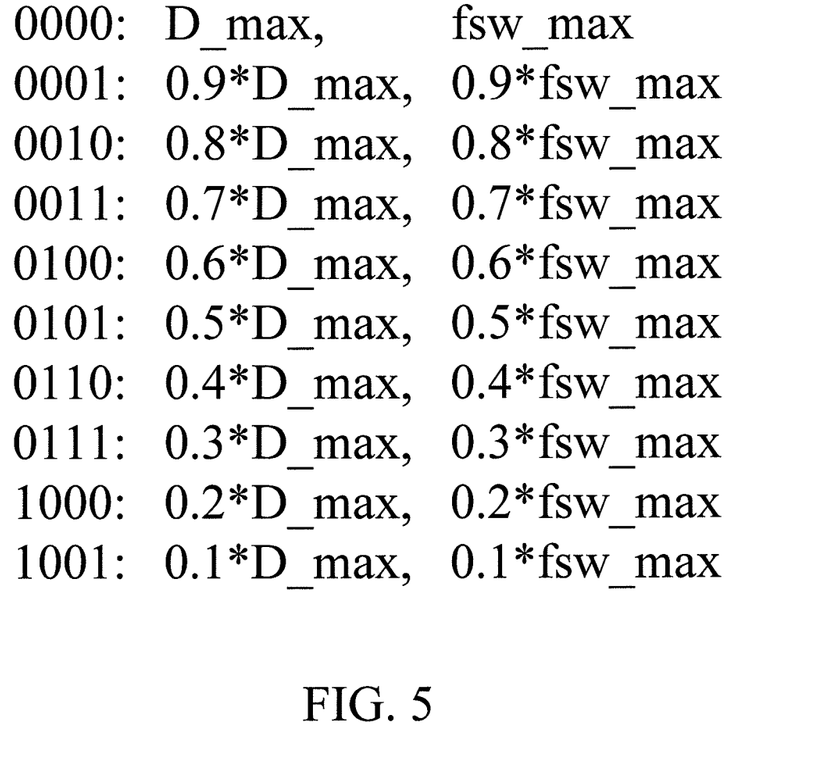
FIG. 5 illustrates schematic diagram of a relationship among the status, the duration and the frequency of the switching controlling signal according to one exemplary embodiment of the present invention.

FIG. 5 illustrates schematic diagram of a relationship among the status, the switch-on duration and the frequency of the switching controlling signal according to one exemplary embodiment of the present invention. The statuses correspond to the switch-on durations and the frequencies. The statuses are the count values of the reversible counter. In one example, the count values from small to large correspond to the voltages of the voltage output status from large to small, and the frequencies of the frequency output status from large to small. For example, the minimum count value of reversible counter 0000 corresponds to the maximum switch-on duration D_max and the maximum frequency of the frequency output status fsw_max; and the maximum count value of reversible counter 1001 corresponds to the minimum switch-on duration 0.1 D_max and the minimum frequency of the frequency output status 0.1 fsw_max.

Figure 6:
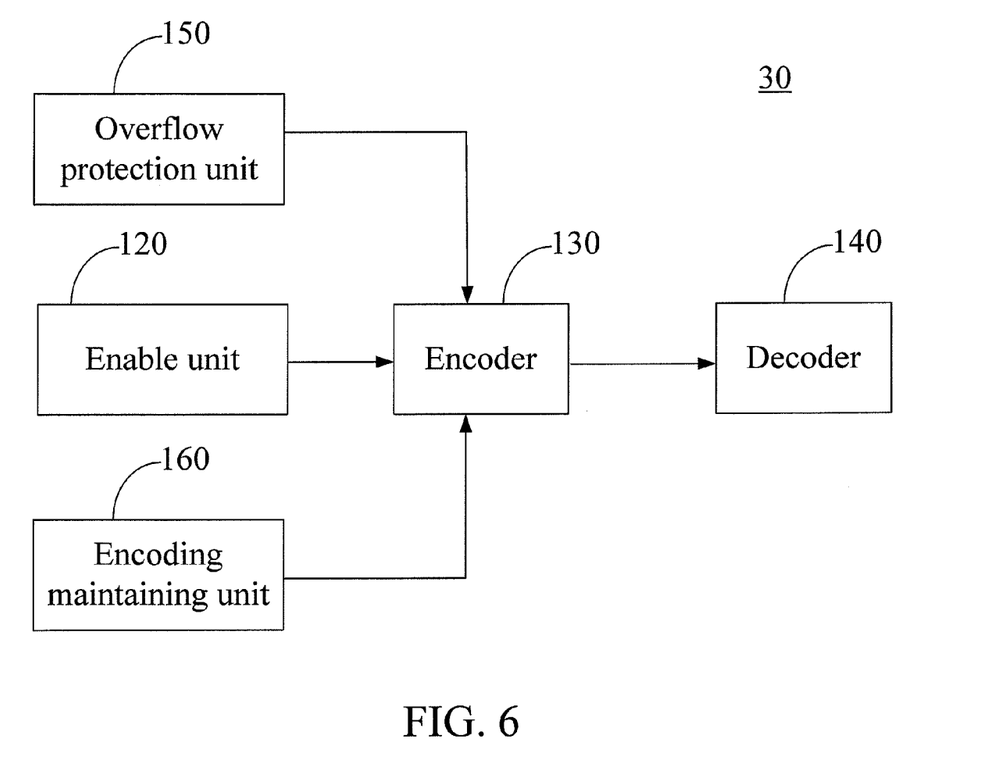
FIG. 6 is a schematic block diagram of the switching status selecting unit according to one exemplary embodiment of the present invention.

FIG. 6 is a schematic block diagram of the switching status selecting unit 30 according to one exemplary embodiment of the present invention. In some exemplary embodiments of the present invention, the encoder 130 is the reversible counter and the switching status selecting unit 30 further comprises an overflow protection unit 150. The overflow protection unit 150 is configured to control the reversible counter to maintain the maximum or minimum count value until the reversible counter changes the count direction when the reversible counter overflows. In some exemplary embodiments of the present invention, the switching status selecting unit 30 further comprise an encoding maintaining unit 160 configured to maintain each status of the reversible counter for one or more switching cycles until the switching cycle ends or the reversible counter changes the count direction.

Figure 7:
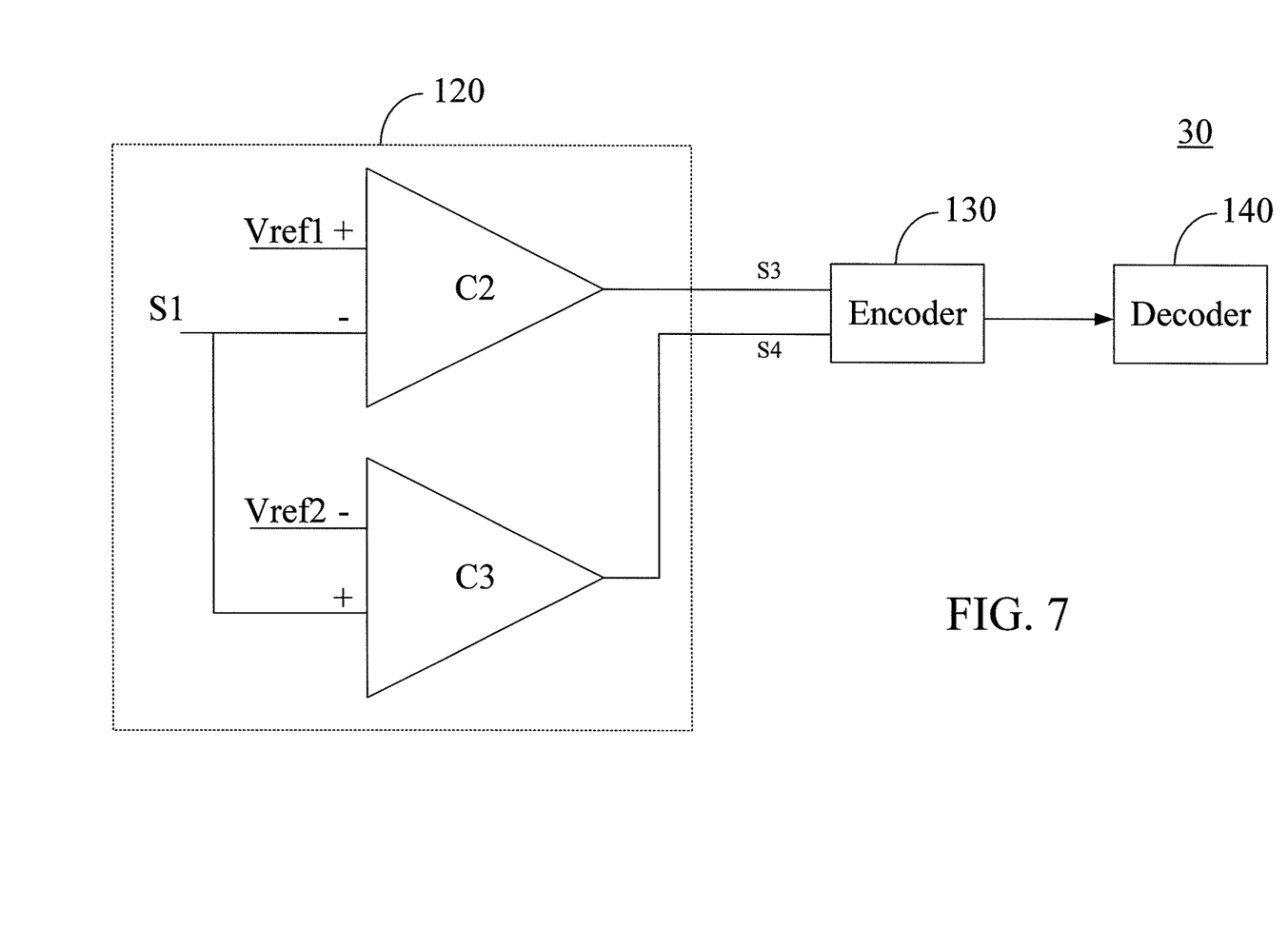
FIG. 7 is a schematic diagram of the switching status selecting unit according to one exemplary embodiment of the present invention.

FIG. 7 is a schematic diagram of the switching status selecting unit 30 according to one exemplary embodiment of the present invention. The enable unit 120 comprises a second comparator C2 configured to output the reset enable signal S3, and a third comparator C3 configured to output the count enable signal S4. The second comparator C2 includes a positive input terminal connected to a first reference voltage Vref1 generated by the reference voltage generating unit 40, a negative input terminal connected to the voltage feedback signal S1, and an output terminal connected to the encoder 130. The third comparator C3 includes a negative input terminal connected to a second reference voltage Vref2 generated by the reference voltage generating unit 40, a positive input terminal connected to the voltage feedback signal S1, and an output terminal connected to the encoder 130. When the second comparator C2 outputs high level, the encoder 130 may be reset and output the minimum count value; when the third comparator C3 outputs high level, the encoder 130 increases by one; and when the third comparator C3 outputs low level, the encoder 130 decreases by one.

Figure 8:
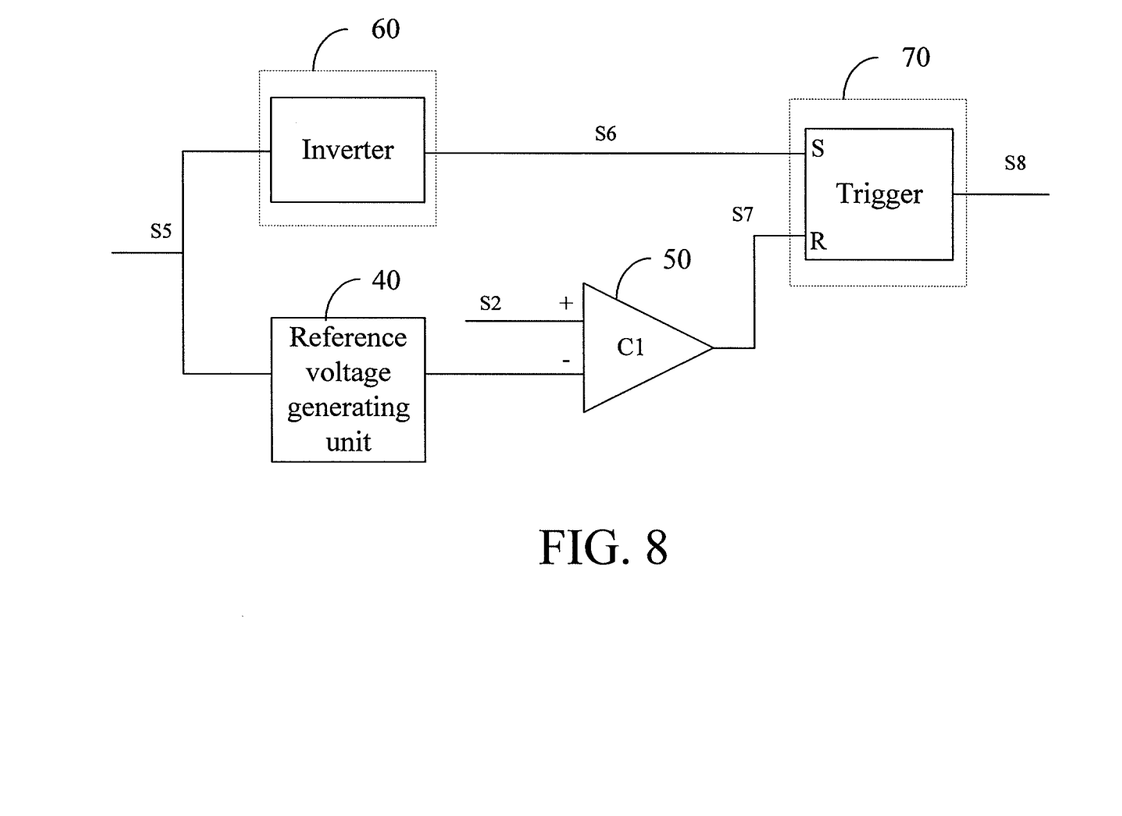
FIG. 8 is a schematic connection diagram among the PFM controlling unit, reference voltage generating unit, first comparator and logic unit according to one exemplary embodiment of the present invention.

FIG. 8 shows the connection among the PFM controlling unit 60, reference voltage generating unit 40, first comparator 50 and logic unit 70 according to one exemplary embodiment of the present invention. The reference voltage generating unit 40 is configured to output a reference voltage according to a voltage output status selected from a plurality of voltage output statuses that correspond to and are directly proportional to the switch-on durations. The voltage output status is selected according to the switching status selecting signal.

The first comparator C1 connected with the reference voltage generating unit 40 and the logic unit 70. The first comparator C1 includes a positive input terminal connected with the current feedback signal S2, and a negative input terminal connected with an output terminal of the reference voltage generating unit 40. The first comparator C1 also includes an output terminal configured to output a pulse width modulation (PWM) controlling signal according to the reference voltage and a current feedback signal that reflects a current change of the main circuit 20.

In some exemplary embodiments of the present invention, the reference voltage generating unit 40 may be configured to output a reference voltage according to a voltage output status selected from ten voltage output statuses corresponding to ten four-digit binary numbers of the reversible counter. And as mention above, the decoder 140 may be configured to convert the status selected and output by the encoder 130 (reversible counter) to the switching status selecting signal. The reference voltage generating unit 40 may therefore be configured to output ten reference voltages according to the switching status selecting signal S5. In one example, the reference voltage generating unit 40 comprises ten voltage divided resistors and ten voltage output switches, and is connected to a system voltage; and the decoder 140 is a 4-16 decoder. When the reversible counter outputs a count value, the decoder 140 converts the count value to ten switching status selecting signals to control ten voltage output switches to switch-on or off, and the reference voltage generating unit 40 may output a reference voltage.

The first comparator 50 may be configured to compare the reference voltage with the current feedback signal S2 and output the comparison result. The first comparator C1 may therefore be configured to output different comparison results according to count values output by the reversible counter, and the PWM controlling signal may be generated to determine the switch-on duration of the switching controlling signal S8.

The PFM controlling unit 60 may comprise an inverter connected to the switching status selecting unit 30, and configured to output a PFM controlling signal with a frequency according a frequency output status select from a plurality of frequency output statuses according to the switching status selecting signal S5. The inverter may be configured to output a PFM controlling signal S6 with the same frequency as the frequency output status selected according to the switching status selecting signal. In one example, the inverter comprises a multi-inverter and a square wave oscillator with a frequency. The multi-inverter may be a ten-way inverter. There may be ten frequency output statuses each of which has a frequency. The frequencies of the frequency output statuses from large to small correspond to the ten four-digit binary numbers from small to large. When the reversible counter outputs a count value, the decoder 140 converts the count value to ten switching status selecting signals to control ten ways of the multi-inverter, and the square wave oscillator may outputs a square wave with a reference voltage. The inverter may output different PFM controlling signals according to count values output by the reversible counter to determine the frequency of the switching controlling signal S8.

The logic unit 70 may comprise an RS trigger. The RS trigger may include an R terminal connected to an output terminal of the first comparator 50, an S terminal connected to an output terminal of the PFM controlling unit 60, and a Q terminal configured to output a switching controlling signal.

Figure 9:
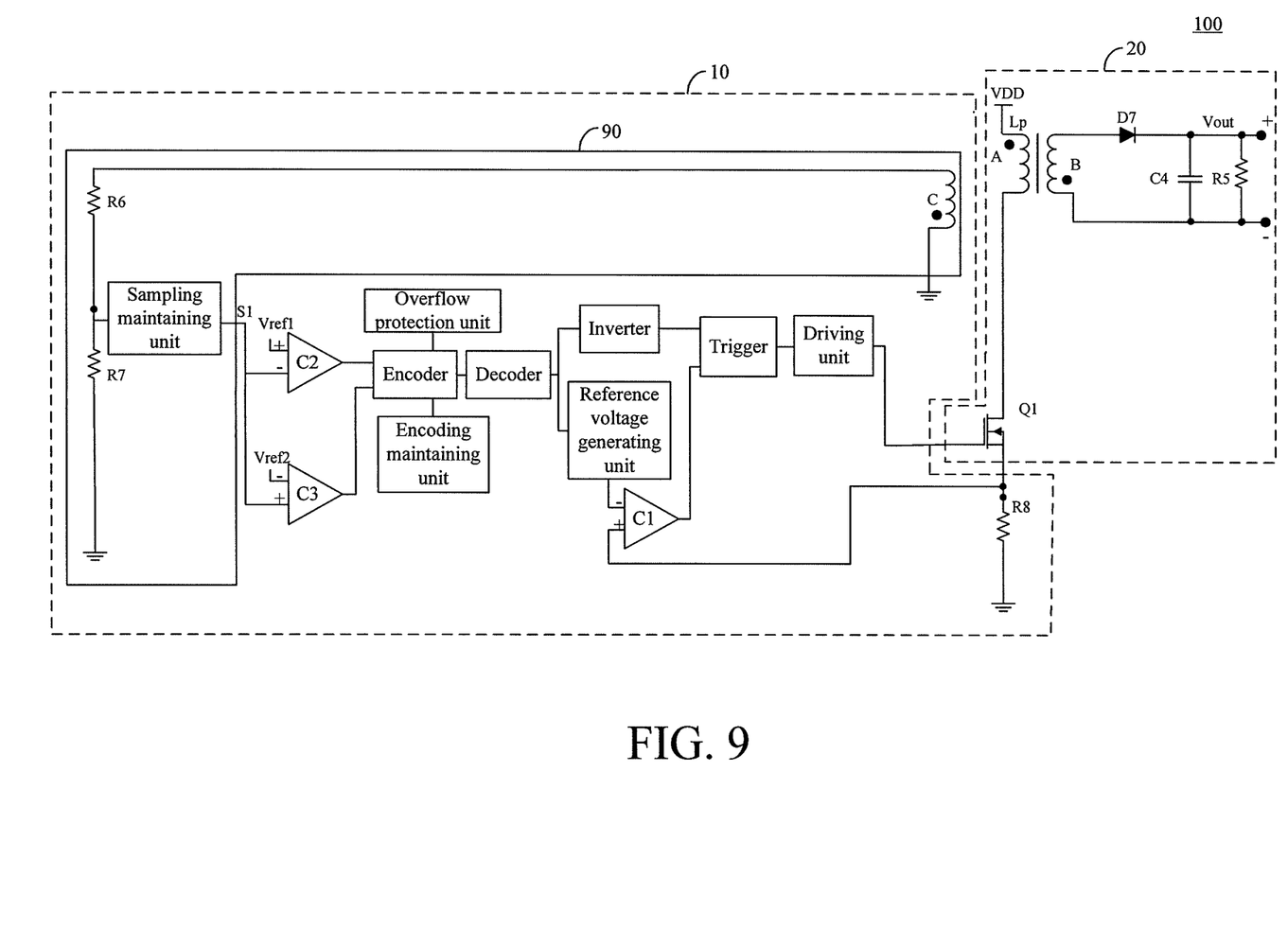
FIG. 9 is a schematic diagram of SMPS according to exemplary embodiments of the present invention.

FIG. 9 is a schematic diagram of a SMPS 100 according to exemplary embodiments of the present invention. The SMPS 100 comprises a SMPS controlling circuit 10 and a main circuit 20. In some exemplary embodiments of the present invention, the main circuit 20 is an isolated power converting circuit or non-isolated power converting circuit. In one example, the isolated power converting circuit comprises a transformer Lp, a power switch Q1, a diode D7, a capacitor C4 and a resistor R5. The transformer Lp comprises a primary wind A and a secondary wind B. As shown in FIG. 9, the SMPS controlling circuit 10 further comprises a first sampling unit 90 and a second sampling unit R8. The first sampling unit 90 comprises an auxiliary wind C, resistors R6 and R7 and a sampling maintaining unit. The voltage feedback signal S1 is a voltage signal inducted by the auxiliary wind, divided by R6 and R7 and rectified by the sampling maintaining unit. The voltage feedback signal S1 may reflect the change of the main circuit 20. In some exemplary embodiments of the present invention, the first sampling circuit is an optical coupler that feedbacks the output voltage of the main circuit to the SMPS controlling circuit 10.

Referring to FIGS. 1-9, the exemplary operation principle of exemplary embodiments of the present invention is described below. When the SMPS enters a stable voltage mode, the second comparator C2 compares the voltage feedback signal and the first reference voltage Vref1, and the third comparator C3 compares the voltage feedback signal and the second reference voltage Vref2. The first reference voltage may be less than the second reference voltage. When the voltage feedback signal is larger than the second reference voltage, that is to say the output voltage of the main circuit is high, the second comparator C2 outputs a count enable signal to the encoder. The count enable signal is high and may control the encoder to increase by one based on the present count value. The decoder then inverts the count value into the switching status selecting signal, and outputs the switching status selecting signal to the PFM controlling unit and the reference voltage generating unit. The increased one count value corresponds to the decreased frequency output status of the PFM controlling unit.

The PFM controlling unit outputs the decreased PFM controlling signal to the S terminal of the RS trigger, which leads the frequency of the switching controlling signal to decrease. Furthermore, the increased one count value corresponds to the decreased voltage output status of the reference voltage generating unit. The reference voltage generating unit outputs the decreased voltage to the negative input terminal of the first comparator. The first comparator C compares the current feedback signal with the decreased the reference voltage, and outputs the PWM controlling signal to the R terminal of the RS trigger, which leads the switch-on duration of the switching controlling signal to decrease. And the decreased switching controlling signal may be obtained, so the switch-on duration and the frequency of the power switch are decreased to decrease the output voltage of the main circuit.

When the voltage feedback signal is less than the second reference voltage, that is to say the output voltage of the main circuit is low, the second comparator C2 outputs a count enable signal to the encoder. The count enable signal is low and may control the encoder to decrease by one based on the present count value. The decoder then inverts the count value into the switching status selecting signal, and outputs the switching status selecting signal to the PFM controlling unit and the reference voltage generating unit. The decreased one count value corresponds to the increased frequency output status of the PFM controlling unit. The PFM controlling unit outputs the decreased PFM controlling signal to the S terminal of the RS trigger, which leads the frequency of the switching controlling signal to increase. Furthermore, the decreased one count value corresponds to the increased voltage output status of the reference voltage generating unit. The reference voltage generating unit outputs the increased voltage to the negative input terminal of the first comparator. The first comparator compares the current feedback signal with the increased the reference voltage and outputs the PWM controlling signal to the R terminal of the RS trigger, which leads the switch-on duration of the switching controlling signal to increase. And the increased switching controlling signal may be obtained, so the switch-on on duration and the frequency of the power switch are increased to increase the output voltage of the main circuit.

In another instance, the voltage feedback signal is less than the first reference voltage, that is to say a transient overload or a transient short circuit appears in the SMPS. In this instance, the second comparator outputs a reset enable signal to the encoder. The reset enable signal is high and may control the encoder to output the minimum count value. So the increased switching controlling signal may be with the maximum switch-on duration and the highest frequency to drive the power switch, and the undershoot voltage of the SMPS may be decreased.

If the count enable signal maintains high, the encoder will continuously increase one. To avoid the overflow appearing, the overflow protection unit is configured to control the reversible counter to maintain the maximum or minimum count value until the reversible counter changes the count direction when the reversible counter overflows.

To improve the stability of the SMPS controlling circuit, in some exemplary embodiments of the present invention, the switching status selecting unit further comprises a encoding maintaining unit configured to maintain each status of the reversible counter for one or more switching cycle until the switching cycle ends or the reversible counter changes the count direction.

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A switched-mode power supply (SMPS) controlling circuit for controlling an output voltage of a main circuit of a SMPS, the SMPS controlling circuit comprising:
  a switching status selecting unit configured to generate a switching status selecting signal according to a voltage feedback signal reflecting a voltage change of the main circuit;
  a reference voltage generating unit connected with the switching status selecting unit, and configured to output a reference voltage according to a voltage output status selected from a plurality of voltage output statuses according to the switching status selecting signal;
  a first comparator connected with the reference voltage generating unit, and configured to output a pulse width modulation (PWM) controlling signal according to the reference voltage, and according to a current feedback signal that reflects a current change of the main circuit;
  a pulse frequency modulation (PFM) controlling unit connected with the switching status selecting unit, and configured to output a PFM controlling signal with a frequency according to a frequency output status selected from a plurality of frequency output statuses according to the switching status selecting signal;
  a logic unit connected with the first comparator and the PFM controlling unit, and configured to output a switching controlling signal according to the PWM controlling signal and the PFM controlling signal; and a driving unit connected with the logic unit, and configured to control a power switch of the main circuit to switch on or switch off to thereby stabilize the output voltage of the main circuit according to the switching controlling signal.

2. The SMPS controlling circuit of claim 1, wherein the switching status selecting unit comprises:
   an enable unit configured to generate an enable signal according to the voltage feedback signal;
   an encoder connected with the enable unit, and configured to select and output a status according to the enable signal, the status being selected from a plurality of statuses corresponding to the voltage output statuses and frequency output statuses; and
   a decoder connected to the encoder, and configured to convert the status selected and output by the encoder to the switching status selecting signal.

3. The SMPS controlling circuit of claim 2, wherein the encoder is a reversible counter,
   wherein the statuses are the count values of the reversible counter, the count values from small to large corresponding to the voltages of the voltage output status from large to small and the frequencies of the frequency output status from large to small, and
   wherein the enable signal comprises a count enable signal configured to control the reversible counter to count up or down, and a reset enable signal configured to control the reversible counter to jump to the minimum count value when the voltage feedback signal is less than the reference voltage.

4. The SMPS controlling circuit of claim 3, wherein the switching status selecting unit further comprises an overflow protection unit configured to control the reversible counter to maintain the maximum or minimum count value until the reversible counter changes the count direction when the reversible counter overflows.

5. The SMPS controlling circuit of claim 3, wherein the switching status selecting unit further comprises a encoding maintaining unit configured to maintain each status of the reversible counter for one or more switching cycles until the switching cycle ends or the reversible counter changes the count direction.

6. The SMPS controlling circuit of claim 3, wherein the enable unit comprises:
   a second comparator configured to output the reset enable signal, the second comparator including a positive input terminal connected to a first reference voltage generated by the reference voltage generating unit, a negative input terminal connected to the voltage feedback signal, and an output terminal connected to the encoder; and
   a third comparator configured to output the count enable signal, the third comparator including a negative input terminal connected to a second reference voltage generated by the reference voltage generating unit, a positive input terminal connected to the voltage feedback signal, and an output terminal connected to the encoder.

7. The SMPS controlling circuit of claim 1, wherein the PFM controlling unit comprises an inverter connected with the switching status selecting unit, the inverter being configured to select a frequency output status from a plurality of frequency output statuses according to the switching status selecting signal, and output a PFM controlling signal with a frequency according to the selected frequency output status.

8. The SMPS controlling circuit of claim 1, wherein the logic unit comprises a RS trigger including an R terminal connected to an output terminal of the first comparator, an S terminal connected to an output terminal of the PFM controlling unit, and a Q terminal configured to output a switching controlling signal.

9. The SMPS controlling circuit of claim 1, wherein the main circuit is an isolated power converting circuit or non-isolated power converting circuit.

10. The SMPS controlling circuit of claim 1 further comprising a first sampling unit connected with the main circuit, and configured to obtain the voltage feedback signal from the main circuit.

11. The SMPS controlling circuit of claim 1 further comprising a second sampling unit connected with the main circuit, and configured to obtain the current feedback signal from the main circuit.

12. A switched-mode power supply (SMPS) comprising:
   a main circuit; and
   a SMPS controlling circuit configured to control an output voltage of the main circuit, the SMPS controlling circuit comprising:
      a switching status selecting unit configured to generate a switching status selecting signal according to a voltage feedback signal reflecting a voltage change of the main circuit;
      a reference voltage generating unit connected with the switching status selecting unit, and configured to output a reference voltage according to a voltage output status selected from a plurality of voltage output statuses according to the switching status selecting signal;
      a first comparator connected with the reference voltage generating unit, and configured to output a pulse width modulation (PWM) controlling signal according to the reference voltage, and according to a current feedback signal that reflects a current change of the main circuit;
      a pulse frequency modulation (PFM) controlling unit connected with the switching status selecting unit, and configured to output a PFM controlling signal with a frequency according to a frequency output status selected from a plurality of frequency output statuses according to the switching status selecting signal;
      a logic unit connected with the first comparator and the PFM controlling unit, and configured to output a switching controlling signal according to the PWM controlling signal and the PFM controlling signal; and
      a driving unit connected with the logic unit, and configured to control a power switch of the main circuit to switch on or switch off to thereby stabilize the output voltage of the main circuit according to the switching controlling signal.

13. The SMPS of claim 12, wherein the switching status selecting unit comprises:
   an enable unit configured to generate an enable signal according to the voltage feedback signal;
   an encoder connected with the enable unit, and configured to select and output a status according to the enable signal, the status being selected from a plurality of statuses corresponding to the voltage output statuses and frequency output statuses; and
   a decoder connected to the encoder, and configured to convert the status selected and output by the encoder to the switching status selecting signal.

14. The SMPS of claim 13, wherein the encoder is a reversible counter,
   wherein the statuses are the count values of the reversible counter, the count values from small to large corresponding to the voltages of the voltage output status from large to small and the frequencies of the frequency output status from large to small, and wherein the enable signal comprises a count enable signal configured to control the reversible counter to count up or down, and a reset enable signal configured to control the reversible counter to jump to the minimum count value when the voltage feedback signal is less than the reference voltage.

15. The SMPS of claim 14, wherein the switching status selecting unit further comprises an overflow protection unit configured to control the reversible counter to maintain the maximum or minimum count value until the reversible counter changes the count direction when the reversible counter overflows.

16. The SMPS of claim 14, wherein the switching status selecting unit further comprises a encoding maintaining unit configured to maintain each status of the reversible counter for one or more switching cycles until the switching cycle ends or the reversible counter changes the count direction.

17. The SMPS of claim 14, wherein the enable unit comprises:
a second comparator configured to output the reset enable signal, the second comparator including a positive input terminal connected to a first reference voltage generated by the reference voltage generating unit, a negative input terminal connected to the voltage feedback signal, and an output terminal connected to the encoder; and
a third comparator configured to output the count enable signal, the third comparator including a negative input terminal connected to a second reference voltage generated by the reference voltage generating unit, a positive input terminal connected to the voltage feedback signal, and an output terminal connected to the encoder.

18. The SMPS of claim 12, wherein the PFM controlling unit comprises an inverter connected with the switching status selecting unit, the inverter being configured to select a frequency output status from a plurality of frequency output statuses according to the switching status selecting signal, and output a PFM controlling signal with a frequency according to the selected frequency output status.

19. The SMPS of claim 12, wherein the logic unit comprises a RS trigger including an R terminal connected to an output terminal of the first comparator, an S terminal connected to an output terminal of the PFM controlling unit, and a Q terminal configured to output a switching controlling signal.

20. The SMPS of claim 12, wherein the main circuit is an isolated power converting circuit or non-isolated power converting circuit.

21. The SMPS of claim 12, wherein the SMPS controlling circuit further comprises a first sampling unit connected with the main circuit, and configured to obtain the voltage feedback signal from the main circuit.

22. The SMPS of claim 12, wherein the SMPS controlling circuit further comprises a second sampling unit connected with the main circuit, and configured to obtain the current feedback signal from the main circuit.

* * * * *